United States Patent [19]
Lange

[11] Patent Number: 5,831,523
[45] Date of Patent: Nov. 3, 1998

[54] VISUAL SAFETY AUTO LIGHTS FOR BRAKING SYSTEM

[76] Inventor: Edward A. Lange, 3 Birchwood Ct. Apt. #5D, Mineola, N.Y. 11501

[21] Appl. No.: 888,256

[22] Filed: Jul. 3, 1997

[51] Int. Cl.⁶ ..................................................... B60Q 1/44
[52] U.S. Cl. .......................... 340/479; 340/478; 340/475; 340/464; 315/82
[58] Field of Search ..................................... 340/479, 467, 340/465, 477, 468, 466, 469, 475, 478, 463, 464; 362/80, 80.1; 188/1.11

[56] References Cited

U.S. PATENT DOCUMENTS

| | | | |
|---|---|---|---|
| 4,357,594 | 11/1982 | Ehrlich et al. | 340/72 |
| 4,638,295 | 1/1987 | Middlebrook et al. | 340/73 |
| 4,712,044 | 12/1987 | Phillips | 315/82 |
| 4,801,917 | 1/1989 | Winterfeld | 340/81 R |
| 4,896,251 | 1/1990 | Fasel | 362/80.1 |
| 4,954,808 | 9/1990 | Duerkob | 340/475 |
| 5,017,904 | 5/1991 | Browne et al. | 340/479 |
| 5,172,095 | 12/1992 | Scott | 340/479 |
| 5,211,466 | 5/1993 | Jarocki et al. | 340/479 |
| 5,345,218 | 9/1994 | Woods et al. | 340/479 |
| 5,614,884 | 3/1997 | Evans | 340/477 |
| 5,663,707 | 9/1997 | Bartilucci | 340/464 |

*Primary Examiner*—Jeffrey A. Hofsass
*Assistant Examiner*—Toan N. Pham

[57] ABSTRACT

A vehicle light system is provided for use with a vehicle having a rear window with a periphery defined by a linear top edge, a linear bottom edge, and a pair of side edges formed therebetween. Provided is a plurality of spaced red light emitting diodes formed along the top edge of the rear window. The red light emitting diodes include a first set of diodes situated to the left of a central extent of the rear window and a second set of diodes situated to the right of the central extent thereof. In use, the red light emitting diodes are adapted to illuminate only during the actuation thereof. Finally, a brake relay control mechanism is adapted to actuate the red light emitting diodes in sequence upon the braking of the vehicle with a short delay therebetween, wherein the red light emitting diodes are actuated in sequence from the central extent of the top edge of the rear window to a side extent thereof.

7 Claims, 2 Drawing Sheets

VISUAL SAFETY AUTO LIGHTS FOR BRAKING SYSTEM

BACKGROUND OF THE INVENTION

1. Field of the Invention

The present invention relates to brake light configurations and more particularly pertains to a new Visual Safety Auto Lights For Braking System for actuating a plurality of brake lights in a unique easily visible sequence.

2. Description of the Prior Art

The use of brake light configurations is known in the prior art. More specifically, brake light configurations heretofore devised and utilized are known to consist basically of familiar, expected and obvious structural configurations, notwithstanding the myriad of designs encompassed by the crowded prior art which have been developed for the fulfillment of countless objectives and requirements.

Known prior art brake light configurations include U. S. Pat. No. 5,404,130; U.S. Pat. No. 5,345,218; U.S. Pat. No. 4983,952; U.S. Pat. No. 5,017,904; U.S. Pat. No. 5,410,294; and U.S. Des. Pat. No. 361,395.

In these respects, the Visual Safety Auto Lights For Braking System according to the present invention substantially departs from the conventional concepts and designs of the prior art, and in so doing provides an apparatus primarily developed for the purpose of actuating a plurality of brake lights in a unique easily visible sequence.

SUMMARY OF THE INVENTION

In view of the foregoing disadvantages inherent in the known types of brake light configurations now present in the prior art, the present invention provides a new Visual Safety Auto Lights For Braking System construction wherein the same can be utilized for actuating a plurality of brake lights in a unique easily visible sequence.

The general purpose of the present invention, which will be described subsequently in greater detail, is to provide a new Visual Safety Auto Lights For Braking System apparatus and method which has many of the advantages of the brake light configurations mentioned heretofore and many novel features that result in a new Visual Safety Auto Lights For Braking System which is not anticipated, rendered obvious, suggested, or even implied by any of the prior art brake light configurations, either alone or in any combination thereof.

To attain this, the present invention generally comprises a vehicle having a rear widow with a periphery. Such periphery is defined by a linear top edge, a linear bottom edge, and a pair of side edges formed therebetween. Next provided is a plurality of spaced circular shaped red light emitting diodes formed along the top edge and the side edges of the rear window. The red light emitting diodes include a first set of diodes situated to the left of a central extent of the rear window and a second set of diodes situated to the right of the central extent thereof. In use, the red light emitting diodes are adapted to illuminate only during the actuation thereof. Situated below the red diodes is a plurality of spaced arrow-shaped yellow light emitting diodes formed along the top edge of the rear window. The yellow light emitting diodes include a first set of diodes situated to the left of the central extent of the rear window and a second set of diodes situated to the right of the central extent thereof. In use, the yellow light emitting diodes are adapted to illuminate only during the actuation thereof. As shown in FIG. 1, a brake relay means is connected to an existing brake light of the vehicle and is adapted to transmit an activation signal upon the illumination of the brake light. It should be noted that the illumination of the brake light is a result of a user of the vehicle braking. The brake relay means further serves to transmit a deactivation signal upon the lack of illumination of the brake light. With reference now to FIG. 2, a pair of turn signal relay means are each shown to be connected to an associated one of a pair of turn signal lights of the vehicle. Each turn signal relay means is adapted to transmit an activation signal upon each illumination of the associated turn signal light as a result of a user of the vehicle actuating a corresponding turn signal lever. Similar to the brake relay means, the present relay means transmits a deactivation signal upon the lack of illumination of the associated turn signal light. With reference again to FIG. 1, a brake control means is connected between the brake relay means, the red light emitting diodes and an oscillator. The brake control means serves to actuate the red light emitting diodes in sequence upon the receipt of the activation signal. The brake control means effects a short delay between the actuation of each of the red light emitting diodes. It should be noted that the red light emitting diodes are actuated in sequence from the central extent of the top edge of the rear window to a lower extent of the side edges thereof. Further, upon the receipt of the deactivation signal, the brake control means is further adapted to cease the actuation of the red light emitting diodes. Finally, a turn signal control means is connected between each turn signal relay means, an associated one of the sets of yellow light emitting diodes and an oscillator. Each of the turn signal control means is adapted to actuate the associated set of yellow light emitting diodes in sequence upon the receipt of the activation signal. Similar to the actuation of the red diodes, the yellow diodes are actuated with a short delay therebetween. To indicate the direction of a turn, the yellow light emitting diodes are actuated in sequence from the central extent of the top edge of the rear window to an associated side extent thereof. Lastly, the turn signal control means is further adapted to cease the actuation of the associated yellow light emitting diodes upon the receipt of the deactivation signal.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature an essence of the technical disclosure of the application. The abstract is neither intended to define the invention of the application, which is measured by the claims, nor is it intended to be limiting as to the scope of the invention in any way.

It is therefore an object of the present invention to provide a new Visual Safety Auto Lights For Braking System apparatus and method which has many of the advantages of the brake light configurations mentioned heretofore and many novel features that result in a new Visual Safety Auto Lights For Braking System which is not anticipated, rendered obvious, suggested, or even implied by any of the prior art brake light configurations, either alone or in any combination thereof.

It is another object of the present invention to provide a new Visual Safety Auto Lights For Braking System which may be easily and efficiently manufactured and marketed.

It is a further object of the present invention to provide a new Visual Safety Auto Lights For Braking System which is of a durable and reliable construction.

An even further object of the present invention is to provide a new Visual Safety Auto Lights For Braking System which is susceptible of a low cost of manufacture with regard to both materials and labor, and which accordingly is then susceptible of low prices of sale to the consuming public, thereby making such Visual Safety Auto Lights For Braking System economically available to the buying public.

Still yet another object of the present invention is to provide a new Visual Safety Auto Lights For Braking System which provides in the apparatuses and methods of the prior art some of the advantages thereof, while simultaneously overcoming some of the disadvantages normally associated therewith.

Still another object of the present invention is to provide a new Visual Safety Auto Lights For Braking System for actuating a plurality of brake lights in a unique easily visible sequence.

Even still another object of the present invention is to provide a new Visual Safety Auto Lights For Braking System that includes a plurality of spaced red light emitting diodes formed along the top edge of a rear vehicle window. The red light emitting diodes include a first set of diodes situated to the left of a central extent of the rear window and a second set of diodes situated to the right of the central extent thereof. In use, the red light emitting diodes are adapted to illuminate only during the actuation thereof. Finally, a brake relay control mechanism is adapted to actuate the red light emitting diodes in sequence upon the braking of the vehicle with a short delay therebetween, wherein the red light emitting diodes are actuated in sequence from the central extent of the top edge of the rear window to a side extent thereof.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
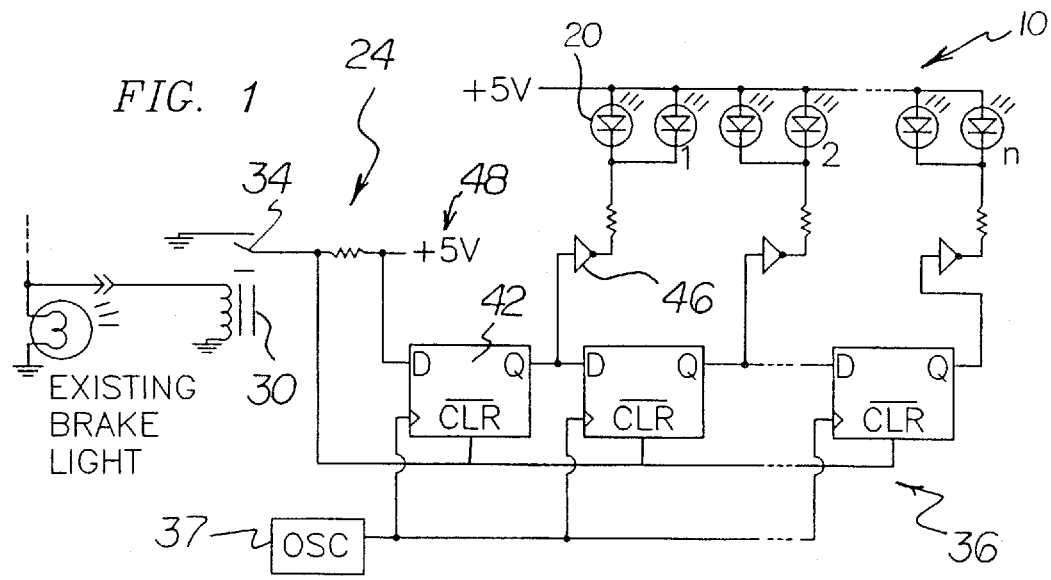
FIG. 1 is a schematic diagram of a new Visual Safety Auto Lights For Braking System according to the present invention.
Figure 2:
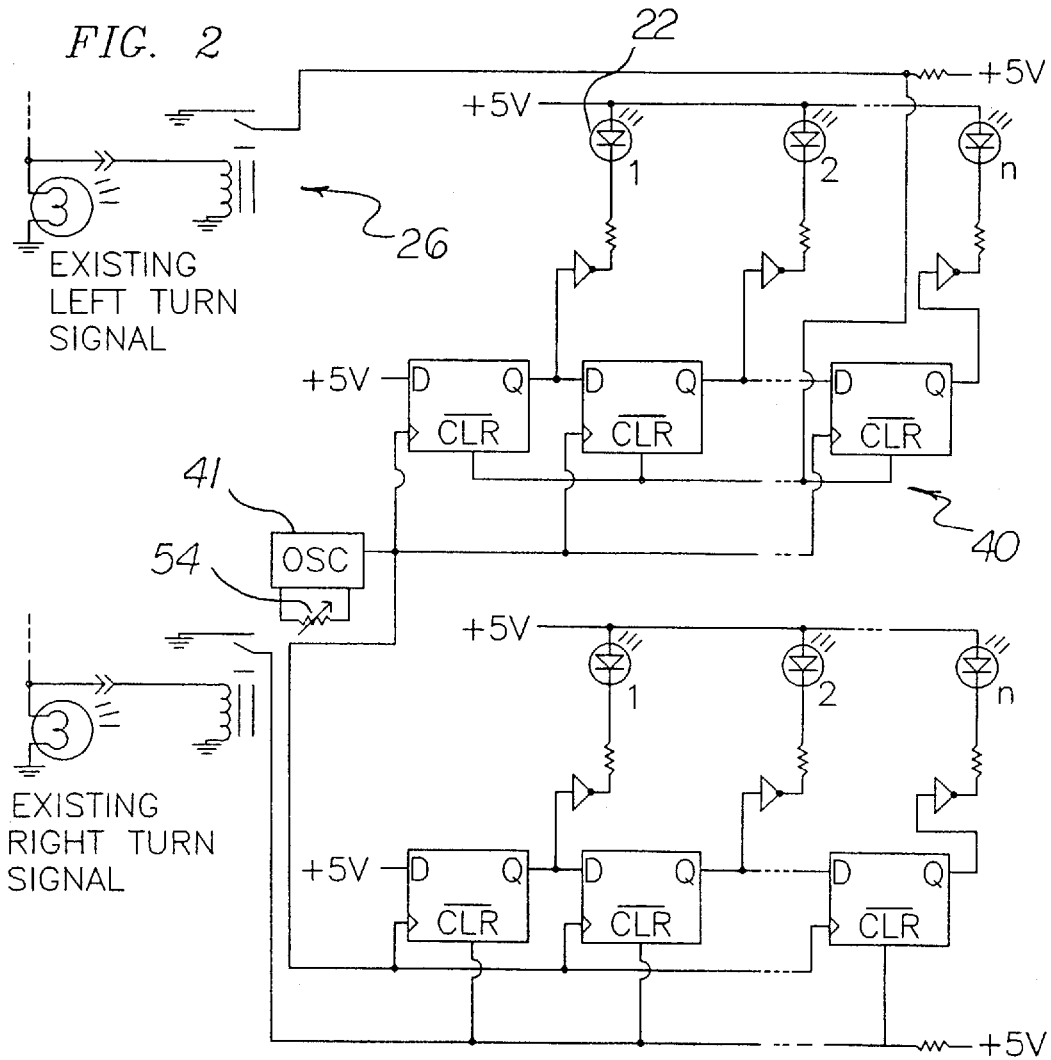
FIG. 2 is another schematic diagram of the present invention.
Figure 3:
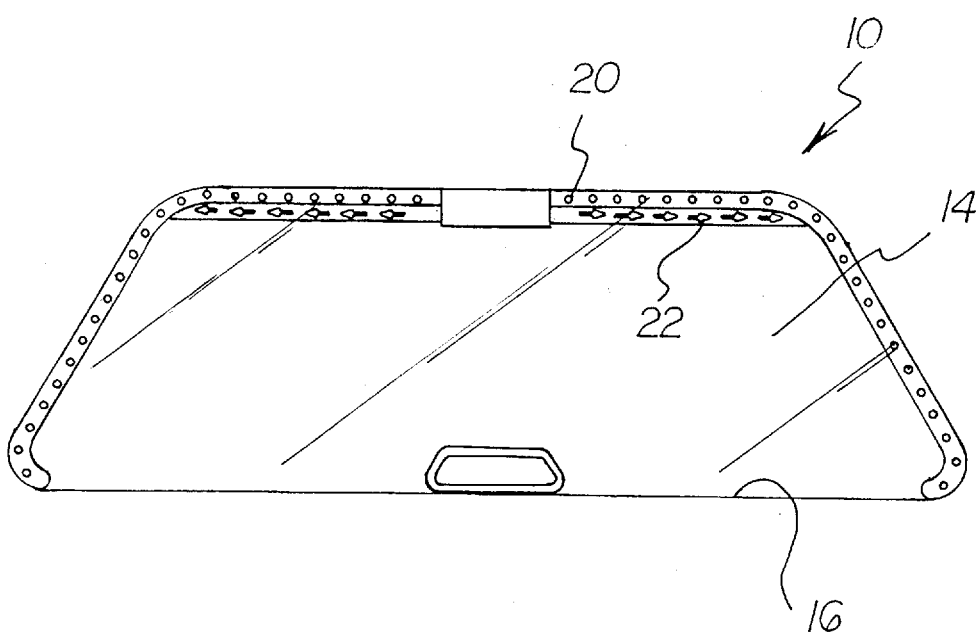
FIG. 3 is a rear view of a vehicle with the diodes of the present invention in place.

With reference now to the drawings, and in particular to FIGS. 1 through 3 thereof, a new Visual Safety Auto Lights For Braking System embodying the principles and concepts of the present invention and generally designated by the reference numeral 10 will be described.

Shown in FIG. 3 is a vehicle 12 having a rear widow 14 with a periphery 16. Such periphery is defined by a linear top edge, a linear bottom edge, and a pair of side edges formed therebetween.

Next provided is a plurality of spaced circular shaped red light emitting diodes 20 formed along the top edge and the side edges of the rear window. The red light emitting diodes include a first set of diodes situated to the left of a central extent of the rear window and a second set of diodes situated to the right of the central extent thereof. In use, the red light emitting diodes are adapted to illuminate only during the actuation thereof.

Situated below the red diodes is a plurality of spaced arrowshaped yellow light emitting diodes 22 formed along the top edge of the rear window. The yellow light emitting diodes include a first set of diodes situated to the left of the central extent of the rear window and a second set of diodes situated to the right of the central extent thereof. In use, the yellow light emitting diodes are adapted to illuminate only during the actuation thereof.

As shown in FIG. 1, a brake relay means 24 is connected to an existing brake light of the vehicle and is adapted to transmit an activation signal upon the illumination of the brake light. It should be noted that the illumination of the brake light is a result of a user of the vehicle braking. The brake relay means further serves to transmit a deactivation signal upon the lack of illumination of the brake light.

With reference now to FIG. 2, a pair of turn signal relay means 26 are each shown to be connected to an associated one of a pair of turn signal lights of the vehicle. Each turn signal relay means is adapted to transmit an activation signal upon each illumination of the associated turn signal light as a result of a user of the vehicle actuating a corresponding turn signal lever. Similar to the brake relay means, the present relay means transmits a deactivation signal upon the lack of illumination of the associated turn signal light.

It should be noted that both of the forgoing relay means comprise a relay 30 connected to a line which is in turn is connected to the associated light of the vehicle. Associated therewith is normally open relay contact 34 connected between a voltage source and ground. The activation signal and deactivation signal are the presence and absence of a voltage when the relay contact is closed and open, respectively.

With reference again to FIG. 1, a brake control means 36 is connected between the brake relay means, the red light emitting diodes and an oscillator 37. The brake control means serves to actuate the red light emitting diodes of both sets thereof in sequence upon the receipt of the activation signal. The brake control means effects a short delay between the actuation of each of the red light emitting diodes. It should be noted that the red light emitting diodes are actuated in sequence from the central extent of the top edge of the rear window to a lower extent of the side edges thereof. Once the lights are all actuated, the diodes remain illuminated until the user of the vehicles removes the brakes. In other words, upon the receipt of the deactivation signal, the brake control means is adapted to cease the actuation of the red light emitting diodes.

Finally, a turn signal control means 40 is connected between each turn signal relay means, an associated one of the sets of yellow light emitting diodes and an oscillator 41. Each of the turn signal control means is adapted to actuate the associated set of yellow light emitting diodes in sequence upon the receipt of the activation signal. Similar to the actuation of the red diodes, the yellow diodes are actuated with a short delay therebetween. To indicate the direction of a turn, the yellow light emitting diodes are actuated in sequence from the central extent of the top edge of the rear window to an associated side extent thereof. Lastly, the turn signal control means is further adapted to cease the actuation of the associated yellow light emitting diodes upon the receipt of the deactivation signal.

To accomplish the various related functions thereof, the forgoing control means each comprise a plurality of D-flip flops 42 with an output connected an associated one of the light emitting diodes and further an input of an adjacent D-flip flop. In the case of the brake control means, the output of each D-flip flop is connected to a pair of corresponding red light emitting diodes each of a different set. Coupled between the light emitting diodes and the output of the associated D-flip flop is a TTL inverter 46 for allowing current to flow through the light emitting diodes upon the output going high.

For reasons that will become apparent later, the input of the first D-flip flop is connected to the voltage source 48. Further, each D-flip flop has a clear input connected to the relay control means for receiving the activation and deactivation signals therefrom. Each D-flip flop is adapted to clear the output thereof upon the receipt of the deactivation signal and further allow the operation of the D-flip flop as a pass gate upon the receipt of the activation signal. Finally, a trigger input of each of the D-flip flops is connected to an oscillator.

By this structure, each D-flip flop of the control means is adapted to act as a pass gate to pass the high input from the voltage source to the output thereof upon each rising edge of the associated clock pulse of the oscillator. As such, the high input is passed from D-flip flop to D-flip flop upon each receipt of the clock pulse thereby actuating the corresponding light emitting diodes in sequence. In the case of the turn signal control means, the clock cycle may be adjusted by way of a potentiometer 54 such that each of the D-flip flops passes the high input of the voltage source between each conventional activation and deactivation of the associated turn signal. It should be noted that with the present design, the turn signal lights are both operated concurrently when a hazard light switch of the vehicle is actuated.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A vehicle light system comprising, in combination:

a vehicle having a rear window with a periphery defined by a linear top edge, a linear bottom edge, and a pair of side edges formed therebetween;

a plurality of spaced circular shaped red light emitting diodes formed along the top edge and the side edges of the rear window, the red light emitting diodes including a first set of diodes situated to the left of a central extent of the rear window and a second set of diodes situated to the right of the central extent thereof, wherein the red light emitting diodes are adapted to illuminate only during the actuation thereof;

a plurality of spaced arrow-shaped yellow light emitting diodes formed along the top edge of the rear window, the yellow light emitting diodes including a first set of diodes situated to the left of the central extent of the rear window and a second set of diodes situated to the right of the central extent thereof, wherein the yellow light emitting diodes are adapted to illuminate only during the actuation thereof;

brake relay means connected to an existing brake light of the vehicle and adapted to transmit an activation signal upon the illumination of the brake light as a result of a user of the vehicle braking and further transmit a deactivation signal upon the lack of illumination of the brake light;

a pair of turn signal relay means each connected to an associated one of a pair of turn signal lights of the vehicle and adapted to transmit an activation signal upon each illumination of the associated turn signal light as a result of a user of the vehicle actuating a corresponding turn signal lever and further transmit a deactivation signal upon the lack of illumination of the associated turn signal light;

brake control means connected between the brake relay means, the red light emitting diodes and an oscillator, the brake control means adapted to actuate the red light emitting diodes in sequence upon the receipt of the activation signal with a short delay between the actuation of each of the red light emitting diodes, wherein the red light emitting diodes are actuated in sequence from the central extent of the top edge of the rear window to a lower extent of the side edges thereof, the brake control means further adapted to cease the actuation of the red light emitting diodes only upon the receipt of the deactivation signal; and turn signal control means connected between each turn signal relay means, an associated one of the sets of yellow light emitting diodes and an oscillator, the turn signal control means adapted to actuate the associated set of yellow light emitting diodes in sequence upon the receipt of the activation signal with a short delay between the actuation of each of the yellow light emitting diodes, wherein the yellow light emitting diodes are actuated in sequence from the central extent of the top edge of the rear window to an associated side extent thereof, the turn signal control means further adapted to cease the actuation of the associated yellow light emitting diodes upon the receipt of the deactivation signal.

2. A vehicle light system comprising:

a vehicle having a rear window with a periphery defined by a linear top edge, a linear bottom edge, and a pair of side edges formed therebetween;

a plurality of spaced light emitting diodes formed along the top edge of the rear window, the light emitting diodes including a first set of diodes situated to the left of a central extent of the rear window and a second set of diodes situated to the right of the central extent thereof, wherein the light emitting diodes are adapted to illuminate only during the actuation thereof; and brake relay control means adapted to actuate the light emitting diodes in sequence upon the braking of the vehicle with a short delay between the actuation of each of the light emitting diodes, wherein the light emitting diodes are actuated in sequence from the central extent of the top edge of the rear window to a side extent thereof.

3. The vehicle light system as set forth in claim 2 wherein the light emitting diodes are red and the brake control relay means further comprises:

brake relay means connected to an existing brake light of the vehicle and adapted to transmit an activation signal upon the illumination of the brake light as a result of a user of the vehicle braking and further transmit a deactivation signal upon the lack of the illumination of the brake light; and brake control means connected between the brake relay means, the red light emitting diodes and an oscillator, the brake control means adapted to actuate the red light emitting diodes in sequence upon the receipt of the activation signal with a short delay between the actuation of each of the red light emitting diodes, wherein the red light emitting diodes are actuated in sequence from the central extent of the top edge of the rear window to a lower extent of the side edges thereof, the brake control means further adapted to cease the actuation of the red light emitting diodes only upon the receipt of the deactivation signal.

4. The vehicle light system of claim 2 additionally comprising:

turn signal control relay means adapted to actuate the set of light emitting diodes associated with the direction of turning upon the turning of the vehicle, said set of light emitting diodes being actuated in sequence with a short delay between the actuation of each of the light emitting diodes, wherein the light emitting diodes are actuated in sequence from the central extent of the top edge of the rear window to an associated side extent thereof.

5. The vehicle light system of claim 4 wherein the light emitting diodes are arrow shaped, each said set of diodes pointing outwardly from said central extent of the rear window.

6. The vehicle light system of claim 5, wherein the light emitting diodes are yellow.

7. The vehicle light system of claim 2, wherein said plurality of spaced light emitting diodes extends along each of said pair of side edges of said rear window.

* * * * *